May 28, 1957 R. J. LIFSEY 2,794,162

TELEVISION ANTENNA ROTATING SERVO SYSTEM

Filed Nov. 17, 1954 2 Sheets-Sheet 1

INVENTOR.

Robert J. Lifsey

BY Victor J. Evans & Co.

ATTORNEYS

TELEVISION ANTENNA ROTATING SERVO SYSTEM

Filed Nov. 17, 1954 2 Sheets-Sheet 2

INVENTOR.

Robert J. Lifsey

BY Victor J. Evans & Co

ATTORNEYS

United States Patent Office 2,794,162

Patented May 28, 1957

2,794,162

TELEVISION ANTENNA ROTATING SERVO SYSTEM

Robert J. Lifsey, Jackson, Tenn.

Application November 17, 1954, Serial No. 469,500

3 Claims. (Cl. 318—265)

This invention relates to television selecting and antenna positioning and tuning devices of the type adapted to be actuated in combination with a television receiver, and in particular, instrumentalities whereby an antenna is rotated to a desired position for receiving signals from a channel upon turning a knob or pointer to a number or character representing the channel on a dial of the receiver.

The purpose of this invention is to provide a television antenna operating device that is adapted to be installed on a television receiver by placing a channel selector switch on the conventional channel control of the receiver.

Various types of devices have been provided for rotating or otherwise adjusting television antennas to correspond with different channels, however, as television receivers are influenced by atmospheric conditions, motors of electric appliances and other disturbing factors, it is sometimes difficult, in tuning in a receiver, to turn the antenna to the correct position for a certain channel. With this thought in mind, this invention contemplates mechanical means adapted to be installed in combination with a television receiver for rotating an antenna and means for breaking a circuit to the actuating means upon the arrival of the antenna to the correct position for a selected channel.

The object of this invention is, therefore, to provide means for automatically setting a television antenna as a knob or pointer of a television receiver is turned to a selected channel.

Another object of the invention is to provide a television antenna operating attachment in which the antenna is turned to correspond with a selected channel in which the device is adapted to be installed on television receivers now in use.

A further object of the invention is to provide a television antenna operating device that is adapted to be actuated in combination with a channel selecting knob of a television receiver in which the device is of a simple and economical construction.

With these and other objects and advantages in view, the invention embodies a housing having a transformer therein and a reversible motor depending therefrom with the motor adapted to rotate an antenna mast extended upwardly from the housing and with a circuit to the motor being adapted to be broken when the mast reaches a position corresponding with a selected channel of the television receiver in combination with which the device is used.

Other features and advantages of the invention will appear from the following description, taken in connection with the drawings, wherein.

Figures 1, 2:
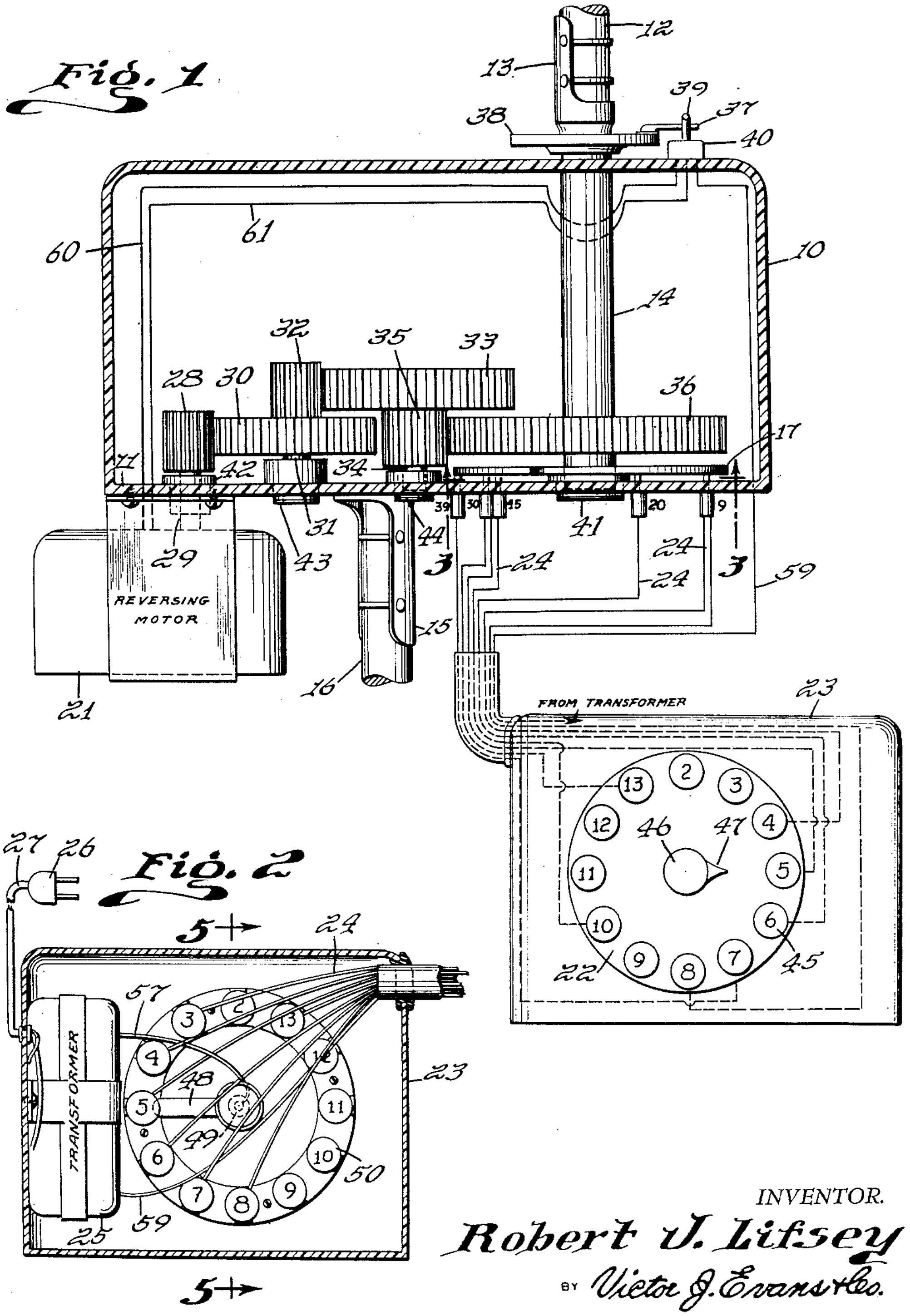
Figure 1 is a vertical longitudinally disposed section through the television antenna mast mounting housing showing the mast operatively connected to a motor through a train of gears; and also showing a selector dial connected by wires to contacts in the base of the housing.
Figure 2 is a section through the dial mounting casing looking toward the inner surface of the dial and showing a transformer in the casing.

Referring now to the drawings, wherein like reference characters denote corresponding parts, the improved selector television antenna rotator of this invention includes a housing 10 having a base 11, an antenna mast 12 secured in a clamp 13 at the upper end of a shaft 14 of the housing, a clamp 15 for mounting the housing on a mast 16, a contact disc 17 mounted on the lower end of the shaft 14 and having a gap or notch 18 therein, a plurality of contact points 19 positioned in openings 20 in the base 11 of the housing, a reversible motor 21 for rotating the antenna and contact disc 17 through a train of gears and a selector dial 22 mounted on a casing 23 and having cables 24 connecting terminals thereof to the contact points 19 with current supplied through a transformer 25 that is adapted to be connected to a source of electric current, such as through a wall outlet box with a plug 26 on a cord 27.

The antenna mast, which is secured by the clamp 13 to the upper end of the shaft 14, is rotated by the motor 21 with a pinion 28 on a motor shaft 29 meshing with a gear 30 on a stub shaft 31. The stub shaft 31 is also provided with a pinion 32 which meshes with a gear 33 on intermediate stub shaft 34 and the stub shaft 34 is provided with a pinion 35 that meshes with a gear 36 on the shaft 14.

The upper part of the shaft 14 is provided with a finger 37 on a disc 38, the finger being positioned to engage a lever 39 of a switch 40 whereby upon rotation of the finger 37 through 360 degrees the lever 39 is engaged from the opposite side, throwing the switch 40 and reversing current to the field winding of the motor 21 whereby the direction of rotation of the motor is reversed.

The lower end of the shaft 14 is rotatably mounted in a bearing 41 in the base 11, the shaft 29 is mounted in a similar bearing 42 and the stub shafts 31 and 34 are also rotatably mounted in similar bearings 43 and 44.

As illustrated in Figures 1 and 2, the dial 21 on which numerals representing the different channels are positioned, as indicated by the numeral 45 is provided with a knob 46 having a pointer 47 and an arm 48 on the inner end of a shaft 49 on which the knob 46 is positioned is adapted to travel with the pointer 47 and is positioned to engage contacts 50 of the different channels and to which the wires 24 are connected.

Figure 3:
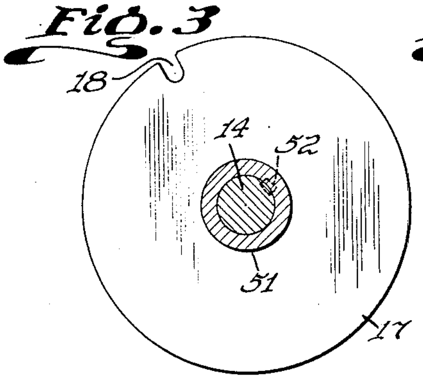
Figure 3 is a view looking upwardly toward the under surface of a contact disc taken on line 3—3 of Figure 1 showing the mounting of the disc and also showing a gap in the periphery thereof.
Figure 4:
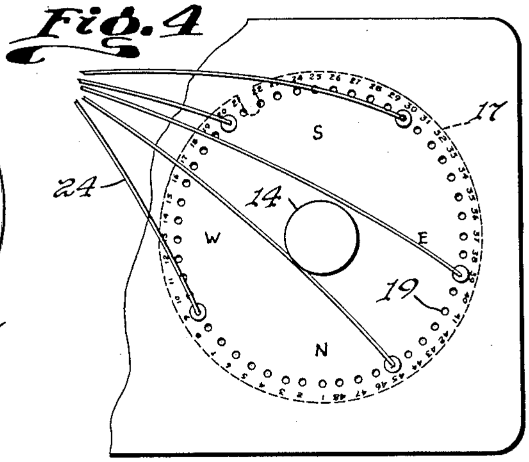
Figure 4 is a plan view looking toward the base of the housing directly below the disc shown in Figure 3 illustrating the arrangement of contact points adapted to be engaged by the disc.
Figure 5:
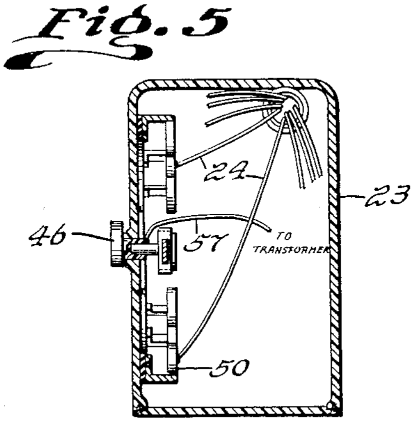
Figure 5 is a cross section through the dial mounting casing taken on line 5—5 of Figure 2.

The switch plate 38 is fixedly mounted on the upper end of the shaft 14 and the disc 17, as illustrated in Figure 3, is provided with a hub 51 that is positioned on the shaft 14 and the hub is secured in position on the shaft with a key 52.

Figures 7, 8:
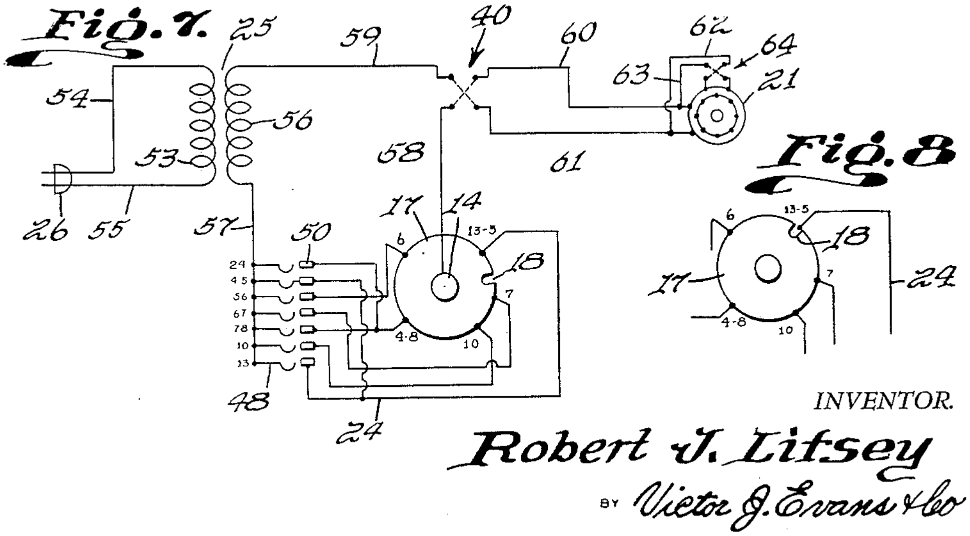
Figure 7 is a wiring diagram showing the circuits of the device and showing the contact disc positioned with a gap in the peripheral surface thereof spaced between terminals of two of the channels.
Figure 8 is a view showing a portion of the wiring diagram and illustrating, in particular, the positon of the contact disc wherein a circuit to one of the channels is broken.

As illustrated in Figure 7 one winding 53 of the transformer 25 is connected by a wire 54 to one side of the plug 26 and by a wire 55 to the other side of the plug with the wires extending to the cable 27. The other winding of the transformer, which is indicated by the numeral 56, is connected by a wire 57 to the shaft 49 and arm 48, the arm 48 being illustrated in multiple and being adapted to engage terminals 50 which are connected by the wires 24 to the contact points 19 that are positioned to engage the disc 17. The disc 17 is mounted on the shaft 14 and the shaft 14 is connected to the throw-off switch 40 with a wire 58, the opposite terminal of the switch being connected to the other side of the transformer winding 56 with a wire 59. The throw-off switch 40 is connected by wires 60 and 61 to the motor 21 and the wires are provided with reversing connections, as indicated by the numerals 62 and 63. The reversing connections 62 and 63 are made to a reversing switch 64 which is adapted to select the shortest angle of rotation to the selected antenna position.

Upon plugging the television set or receiver into a wall socket and setting the pointer 47 or knob 46 to the position shown in Figure 1, such as on channel 5, a circuit is completed to the motor, whereby the disc 17 is rotated until the gap 18 therein arrives at a terminal or contact, such as the contact 19, at which time a circuit is broken to the motor and rotation of the disc 17, shaft 14 and antenna mast 12 is halted.

By this means, the position of the antenna moves instantly to the correct position for a channel as the pointer of the knob 46 is directed toward the channel and with the points for the different channels being adjusted by a service man by means of a field strength meter or compass for a particular location the antenna automatically follows a selector until it arrives at the most desirable position for a channel selected.

It will be understood that any suitable number of channels or contacts may be used and circuits connecting the parts may be provided by suitable means.

Figure 6:
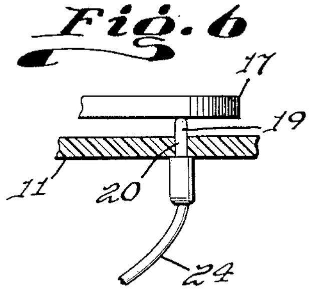
Figure 6 is a section showing the mounting of one of the contacts illustrated in Figure 4 in the base of the housing and showing the contact disc in engagement with the upper end of the contact.

With the terminals 19 provided in the form of plugs, as illustrated in Figure 6, the positions of the different terminals are adapted to be adjusted by a service man to compensate for different locations of a television receiver and should such conditions change due to atmospheric conditions or other interferences the positions of the contact points may readily be changed.

It will be understood that modifications, within the scope of the appended claims, may be made in the design and arrangement of the parts without departing from the spirit of the invention.

What is claimed is:

1. In a television antenna rotator, the combination which comprises a housing having a base, an antenna mast holder rotatably mounted in said housing, a motor carried by the housing and operatively connected by a train of gears to said holder, a plurality of contact points mounted in the base of the housing and positioned in a circle concentric with said holder, a disc having a gap therein carried by the holder and positioned to engage said contacts, a channel selector dial adapted to be connected to the channel control switch of a television receiver and having an antenna position switch operated thereby, a transformer connected with said antenna position switch, and circuits connecting said contact points to terminals of said antenna position switch whereby upon setting the channel selector dial to a channel a circuit is completed to the motor to rotate the antenna mast holder to such a position that an antenna carried thereby is adapted to receive signals of a channel to which the channel selector dial is set.

2. In a television antenna rotator, the combination which comprises a housing having a base, an antenna mast holder rotatably mounted in said housing, a motor carried by the housing and operatively connected by a train of gears to said holder, a plurality of contact points mounted in the base of the housing and positioned in a circle concentric with said holder, a disc having a gap therein carried by the holder and positioned to engage said contacts, a channel selector dial adapted to be connected to the channel control switch of a television receiver and having an antenna position switch operated thereby, a transformer connected with said antenna position switch, and circuits connecting said contact points to terminals of said antenna position switch whereby upon setting the channel selector dial to a channel a circuit is completed to the motor to rotate the antenna mast holder to such a position that an antenna carried thereby is adapted to receive signals of a channel to which the channel selector dial is set, a first reversing switch for reversing the circuit of the motor to reverse the direction of rotation of the motor, and a second reversing switch for selecting the shortest angle of rotation to the selected antenna position.

3. In a television antenna rotator, the combination which comprises a housing having a base, an antenna mast holder rotatably mounted in said housing, a motor carried by the housing and operatively connected by a train of gears to said holder, a plurality of contact points mounted in the base of the housing and positioned in a circle concentric with said holder, a disc having a gap therein carried by the holder and positioned to engage said contacts, a channel selector dial adapted to be connected to the channel control switch of a television receiver and having an antenna position switch operated thereby, a transformer connected with said antenna position switch, and circuits connecting said contact points to terminals of said antenna position switch whereby upon setting the channel selector dial to a channel a circuit is completed to the motor to rotate the antenna mast holder to such a position that an antenna carried thereby is adapted to receive signals of a channel to which the channel selector dial is set, a first reversing switch for reversing the circuit of the motor to reverse the direction of rotation of the motor, the positions of said contact points being adapted to be adjusted to compensate for different locations in which the television set is positioned, and a second reversing switch for selecting the shortest angle of rotation to the selected antenna position.

References Cited in the file of this patent

UNITED STATES PATENTS

| | | |
|---|---|---|
| 2,272,431 | Rankin | Feb. 10, 1942 |
| 2,380,270 | Suhr et al. | July 10, 1945 |
| 2,520,749 | Ware et al. | Aug. 29, 1950 |